(12) United States Patent
Tullis et al.

(10) Patent No.: US 6,965,721 B1
(45) Date of Patent: Nov. 15, 2005

(54) INTEGRATED MANUFACTURE OF SIDE-POLISHED FIBER OPTICS

(76) Inventors: Barclay J. Tullis, 1795 Guinda St., Palo Alto, CA (US) 94303; John H. Prince, 1925 Quailmeadow, Los Altos, CA (US) 94024

( * ) Notice: Subject to any disclaimer, the term of this patent is extended or adjusted under 35 U.S.C. 154(b) by 0 days.

(21) Appl. No.: 10/917,574

(22) Filed: Aug. 12, 2004

Related U.S. Application Data

(62) Division of application No. 09/837,325, filed on Apr. 18, 2001, now abandoned.

(51) Int. Cl.[7] .................................................. G02B 6/00
(52) U.S. Cl. ..................................... 385/137; 385/147
(58) Field of Search ............................. 385/27, 48, 30, 385/42, 39, 51, 137, 147; 451/41, 42, 44

(56) References Cited

U.S. PATENT DOCUMENTS

| | | | | |
|---|---|---|---|---|
| 4,475,790 A | * | 10/1984 | Little ........................ | 385/137 |
| 4,493,528 A | * | 1/1985 | Shaw et al. ................. | 385/30 |
| 4,536,058 A | * | 8/1985 | Shaw et al. ................. | 385/30 |
| 4,556,279 A | * | 12/1985 | Shaw et al. ................. | 385/30 |
| 4,564,262 A | * | 1/1986 | Shaw ........................ | 385/30 |
| 4,601,541 A | * | 7/1986 | Shaw et al. ................. | 385/30 |
| 4,682,848 A | * | 7/1987 | Cairns et al. ................ | 385/69 |
| 4,688,882 A | * | 8/1987 | Failes ....................... | 385/30 |
| 4,802,727 A | * | 2/1989 | Stanley ...................... | 385/89 |
| 4,919,510 A | * | 4/1990 | Hoke et al. .................. | 385/95 |
| 5,187,760 A | * | 2/1993 | Huber ........................ | 385/37 |
| 5,243,673 A | * | 9/1993 | Johnson et al. .............. | 385/90 |
| 5,351,331 A | * | 9/1994 | Chun et al. .................. | 385/97 |
| 5,633,968 A | * | 5/1997 | Sheem ....................... | 385/53 |
| 5,659,647 A | * | 8/1997 | Kravitz et al. ............... | 385/52 |
| 5,781,675 A | * | 7/1998 | Tseng et al. ................. | 385/30 |
| 5,809,188 A | * | 9/1998 | Tseng et al. ................. | 385/37 |
| 5,810,968 A | * | 9/1998 | Dannoux .................... | 156/580 |
| 6,011,881 A | * | 1/2000 | Moslehi et al. .............. | 385/10 |

* cited by examiner

Primary Examiner—Khiem Nguyen
(74) Attorney, Agent, or Firm—Barclay J. Tullis

(57) ABSTRACT

New methods of manufacture are disclosed for producing side-polished fiber-optic apparatuses, for use both singly and in compact arrays. These new methods involve process steps, many of which operate on many apparatus units simultaneously, with little additional manual labor over what is required to produce one unit at a time. High level assemblies of these fiber-optic apparatuses are also disclosed as compact arrays that not only save space but allow for easy interconnection. Examples of apparatuses that can be made with the disclosed integrated side-polished fiber-optic technology include, but aren't limited to, couplers, multiplexers, taps, splitters, joiners, filters, modulators and switches. By interconnecting elements within compact integrated arrays of these apparatuses, complicated photonic circuits can be readily constructed.

16 Claims, 10 Drawing Sheets

INTEGRATED MANUFACTURE OF SIDE-POLISHED FIBER OPTICS

CROSS-REFERENCE TO RELATED APPLICATIONS

This application is a Division of prior application Ser. No. 09/837,325, filed 18 Apr. 2001. A co-pending application of that prior Application, entitled "Structures and Methods for Aligning Fibers", having application Ser. No. 09/825,821, filed 4 Apr. 2001, and since issued as U.S. Pat. No. 6,516,131, is incorporated herein.

FEDERALLY SPONSORED RESEARCH

Not Applicable

SEQUENCE LISTING OR PROGRAM

Not Applicable

BACKGROUND OF THE INVENTION

This invention generally pertains to methods for adding process integration to the manufacture of fiber-optic apparatuses implemented with side-polished fiber optics. This invention also pertains to integrated apparatuses made from these methods of manufacture.

There is no prior art method or apparatus published, or on the market, for fully utilizing the advantages of integrated processes with silicon to manufacture side-polished fiber-optic apparatuses and systems, other than the photomasking of multiple features such as grooves, or the deposition of coatings. What is known in the prior art deals with individually placing fibers in grooves, one-at-a-time. Once placed they may all be polished in one step. This prior art is limited to the manufacture of side-polished fibers to implement two-port photonic functions. This known art is taught in the U.S. Pat. No. 5,781,675 "Method for preparing fiber-optic polarizer" and U.S. Pat. No. 5,809,188 "Tunable optical filter or reflector", both by Tseng. In those patents, Tseng teaches the use of a set of parallel and variable-depth V-grooves etched in a common silicon crystal substrate to simultaneously achieve both a) precise control of remaining side-wall thickness left on each fiber held within each of the V-grooves, b) arcuate paths for the fibers which enable the side-polished regions to be of a controlled length, and c) simultaneous deposition of one or more films on the set of side-polished regions. Not taught in the above patents are multi-function apparatuses or methods for manufacturing multiple apparatuses on a common fiber without fuse splicing or physical connectors. Also not disclosed are a) methods or apparatuses for fabricating multiple units simultaneously, other than the substrates themselves or 2-port polarizers or filters; b) methods or apparatuses wherein some multiples of individual apparatuses are formed with at least one fiber in common; or c) any methods or apparatuses for fiber-to-fiber alignment when coupling side-polished areas to one another between fibers in respectively different substrates.

Earlier art teaches side-polished fiber optics made by retaining the fiber within a groove cut into the surface of a non-crystalline material such as glass or quartz. This art can be found in such U.S. patents as U.S. Pat. No. 4,493,528 "Fiber-optic directional coupler", U.S. Pat. No. 4,536,058 "Method of manufacturing a fiber-optic directional coupler", U.S. Pat. No. 4,556,279 "Passive fiber-optic multiplexer", U.S. Pat. No. 4,564,262 "Fiber-optic directional coupler", U.S. Pat. No. 4,601,541 "Fiber-optic directional coupler", U.S. Pat. No. 6,011,881 "Fiber-optic tunable filter", all by Shaw. This art also teaches the requirement of one side-polished fiber along side of a second side-polished fiber, but fails to disclose any means of mechanical self-alignment.

Earlier art also includes apparatuses and methods of aligning optical components using constant-depth V-grooves in the surfaces of silicon substrates. Three examples include U.S. Pat. No. 5,633,968 "Face-lock interconnection means for optical fibers and other optical components and manufacturing methods of the same" by Sheem, U.S. Pat. No. 4,475,790 "Fiber-optic coupler" by Little, and U.S. Pat. No. 4,802,727 "Positioning optical components and waveguides" by Stanley. Another U.S. patent, U.S. Pat. No. 4,688,882 "Optical contact evanescent wave fiber-optic coupler" by Failes, not only references some of the earliest work of constructing substrate-supported, side-polished, fiber-optic apparatuses, but also describes some of the limitations involved. This patent by Failes teaches a method of achieving a fused coupling between side-coupled fibers that doesn't require the index-matching coupling fluid of previous works. Failes did not offer any approaches to precisely and rigidly support the fibers through intimate contact with respective hard substrates.

Another relevant prior art is that of U.S. Pat. No. 5,187,760 "Wavelength selective coupler for high power optical communications" by Huber. This patent references little of the above prior art, and is evidently what is called a "non-enabling" patent because it does not provide the reader with information on how to practically implement the structures described and claimed. It describes the use of gratings with which to couple light within a wavelength band between a first fiber and a second fiber. In fact it also describes doing this at more than a single location along the length of the second fiber, wherein the multiple first fibers have respective gratings with different wavelength bands. What is needed is a practicable way in which to implement such structures and apparatuses successfully.

Additional prior art on positioning of fiber optics on substrates is found in the technology of Microelectronic Mechanical Systems (MEMS). One reference to such technology is that of "MEMS Packaging for Micro Mirror Switches", by L. S. Huang, S. S. Lee, E. Motamedi, M. C. Wu, and C. J. Kim, Proc. 48th Electronic Components & Technology Conference, Seattle, Wash., May 1998, pp. 592–597.

None of the above art, with the exception of a co-pending application entitled "Structures and Methods for Aligning Fibers", by Tullis, now issued as U.S. Pat. No. 6,516,131, teaches methods or apparatuses for facilitating the placement of an array of fibers into an array of grooves of width comparable to the diameter of the fiber.

Practicable methods and apparatuses are needed to achieve simultaneous assembly of fibers into precision grooves in supporting substrates.

The current invention goes beyond one-at-a-time fabrication and introduces process integration methods by which to greatly reduce the cost of manufacturing side-polished fiber-optic apparatuses. Furthermore, the current invention makes possible the integration of compact arrays of side-polished apparatuses that can be used to implement high levels of function integration. And not all of the multiple apparatuses manufactured on a common substrate need be of the same type.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the methods and apparatuses and combinations particularly pointed out in the appended claims.

The objects of the invention are primarily twofold. One object is to provide new methods for low-cost manufacture of side-polished fiber optics, for use both singly and in compact arrays. These new methods involve process steps, many of which operate on many apparatus units simultaneously, with little additional manual labor over what is required to produce one unit at a time. The other primary object is to create high level assemblies of these fiber-optic apparatuses in compact arrays that not only save space but also allow for easy interconnection. Examples of apparatuses that can be made with the disclosed integrated side-polished fiber-optic technology include optical pass-throughs, attenuators, polarizers, couplers, multiplexers, taps, splitters, joiners, filters, modulators and switches. By interconnecting elements within compact integrated arrays of these apparatuses, complicated photonic circuits can be readily constructed, examples of which include a many-to-one multiplexer, a one-to-many demultiplexer and cross-point switch arrays. The reader will readily appreciate the novel methods and structures used to realize manufacturable fiber-optic apparatuses and circuits for performing needed all-fiber photonic functions.

These and other objects of the invention are provided by a novel use of combining integrated manufacturing methods used in the semiconductor electronics field with silicon-based side-polished fiber-optic technology. Whole silicon wafers (or wafers of other suitable cubic crystal materials such as Ga—As or Lithium Niobate) are patterned and etched to construct V-grooves at many sites simultaneously in a single masking and etching process level. Then rows of these sites are diced and separated leaving multiple sites within each row or silicon strip. Then parallel fibers are installed and bonded into the V-grooves within a strip, and the side-polishing step is performed on all the fibers within a row or strip in a single polishing operation. Following the polishing step, additional steps can be performed on the side-polished areas to create a range of 2-port apparatuses from the group including an optical pass-through, an attenuator, a polarizer, a filter, a modulator, and a switch. These strips of 2-port apparatuses can then be diced into separate smaller strips, individual fiber units, or left intact as complete arrays. These 2-port strips or individual units can be combined in pairs to form strips or individual units of 4-port apparatuses. And the strips of 2 or 4-port apparatuses can be stacked into 2-dimensional arrays. Within a strip or stack of strips, the individual 2-port and/or 4-port apparatuses can be connected in series and/or parallel to create compact optical circuits.

By using fiber-core gratings and/or surface gratings in regions of the side-polished areas and coiling a fiber around to loop through one adjacent V-groove per cycle along a strip, compact multi-channel optical add-drop multiplexers (OADMs) are easily constructed.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1A:
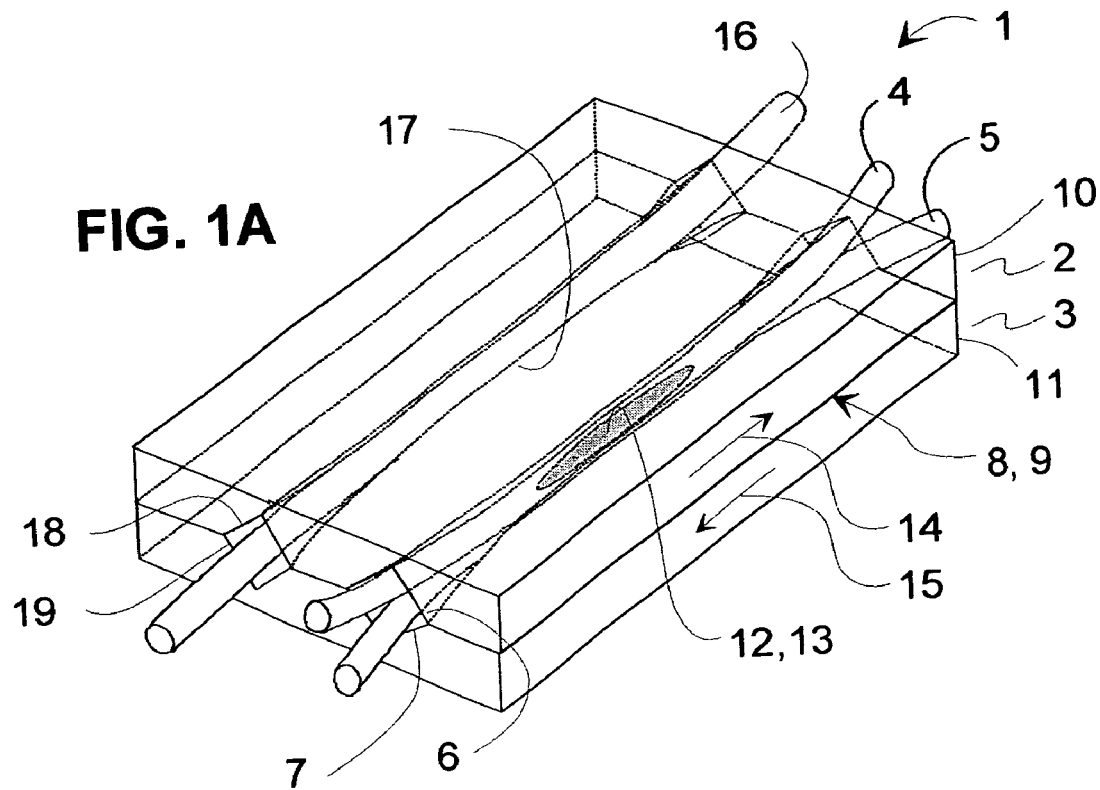
FIG. 1 shows how varying the widths of face-to-face grooves, and alignment with a sliding, even slightly rotatable, fiber key, can facilitate the tuning of coupling efficiency in a 4-port fiber optic made with side-polished fibers.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
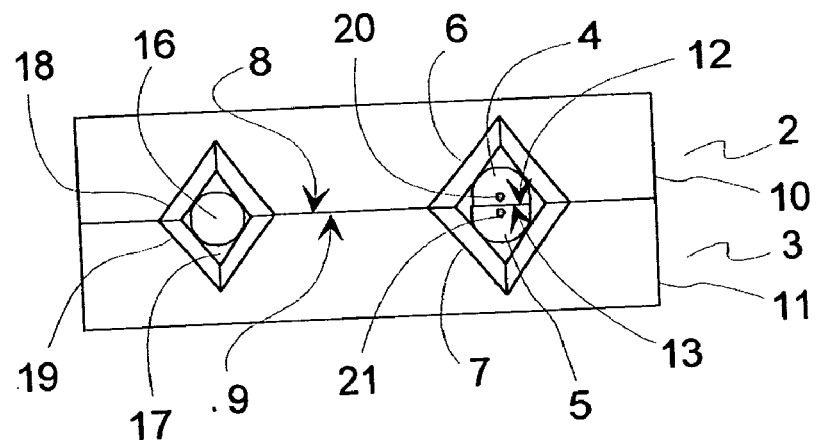

Reference is now made to FIG. 1, which consists of two parts, FIG. 1A and FIG. 1B. FIG. 1 shows art presented and claimed in U.S. Pat. No. 6,516,131, by Tullis, titled "Structures and Methods for Aligning Fibers". FIG. 1 shows how varying the widths of face-to-face grooves, as well as alignment with a sliding fiber key, can facilitate the tuning of coupling efficiency between two fibers within a 4-port apparatus. This apparatus can be any of the group including couplers, add-drop multiplexers, taps, splitters, joiners, filters, modulators and switches. This tuning is accomplished by adjusting the interaction length between two evanescently coupled fibers. Although only a single 4-port apparatus is shown, one can easily envision multiple 4-port apparatuses constructed side-by-side within the same two substrates. And additional alignment grooves and their keying fibers may also be included.

FIG. 1A shows a tunable 4-port fiber-optic apparatus 1, such as a coupler or add-drop multiplexer. This 4-port apparatus 1 is comprised of two half-couplers 2 and 3 comprised in turn of respective side-polished fibers 4 and 5 installed within respective varying-width V-grooves 6 and 7 etched into 100 crystal surfaces 8 and 9 respectively (shown face-to-face) of respective substrates 10 and 11. The two substrates can be slid over one another in the direction parallel to the long axes (not shown) of the two side-polished areas 12 and 13. The two side-polished areas 12 and 13 are shown at a position where they overlap one another. The side-polished areas 12 and 13 of the fibers 4 and 5 have an elliptical shape with long axes parallel to the groove axes (not shown). The arrows 14 and 15 indicate the direction of motion desired. The apparatus 1 is additionally comprised of a third fiber 16. Fiber 16 is in a bi-directionally tapered channel 17 constructed of two additional varying-width V-grooves 18 and 19 etched into the surfaces 8 and 9, parallel to grooves 6 and 7 but offset from them. Fiber 16 serves as an alignment key within this channel 17, but allows for the motion described with which to tune the coupling ratio and efficiency of the 4-port assembly. By eliminating any linear portion to the channel 17, the two half-couplers 2 and 3 may be allowed some rotation which is easy to control with the substrates being of a significant scale larger than the side-polished areas, but remain well aligned in the direction of offset just described. Yet another advantage of the bi-directionally tapered channels 17 and that formed by grooves 6 and 7, is that the fibers 16, 4 and 5 will experience less chance to be bent and strained entering or leaving the channel 17 than were it of constant cross-section. The taper at the ends of these channels can be accentuated to help achieve additional avoidance of strain on the fibers 16, 4 and 5 from otherwise being bent about a sharp edge. It is important in high-bandwidth fiber-optic applications, such as in modern data- and telecommunications networks, to avoid straining fibers. This is because strain induces birefringence in the fiber and this causes polarization mode-dispersion that can result in high bit-error-rates.

FIG. 1B shows an end-view of the apparatus illustrated in FIG. 1A with all similar parts identified by the same numbers, except the view is as though the fibers 16, 4 and 5 were terminated at the midpoints of the channels. In addition, the cores 20 and 21 to fibers 4 and 5 are depicted as shaded disks or spots. Note how in this view, one can see the interface between the two side-polished areas 12 and 13 as the region of contact between them. And one can perceive how the side-polish has allowed the cores 20 and 21 of the two fibers 4 and 5 to lie closer to one another to cause better evanescent coupling of light waves between the two cores 20 and 21.

Figure 2A:
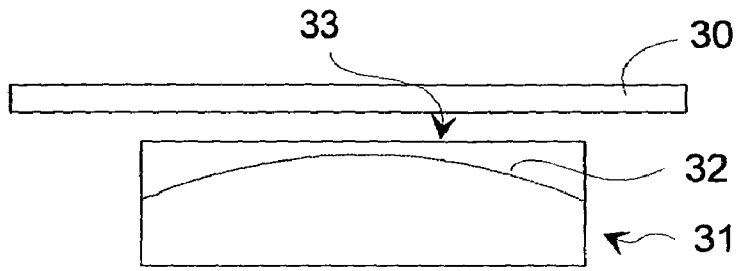
FIG. 2 shows steps along a process for fabricating a freestanding 4-port coupler. Various contiguous steps of this process also form, with some slight modifications, alternative processes. These alternative processes can be used to fabricate the following: i) a 4-port coupler with a single substrate; ii) a 4-port coupler sandwiched between two substrates; iii) a 4-port coupler sandwiched between two substrates with one of these substrates serving as a small protective cover; iv) a free-standing half-coupler; and v) a half-coupler within a single substrate.
Figure 2B:
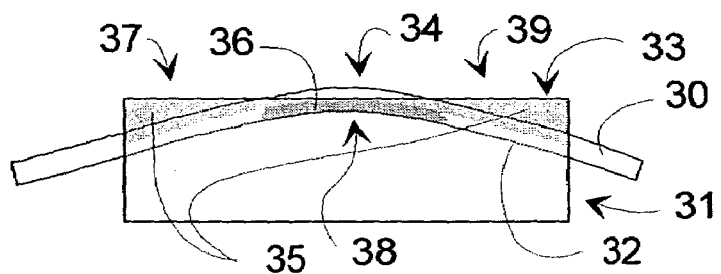
Figure 2C:
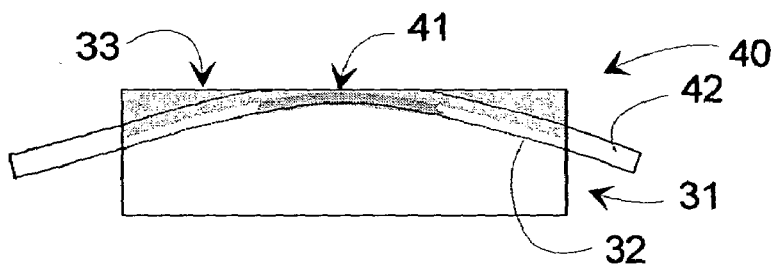
Figure 2D:
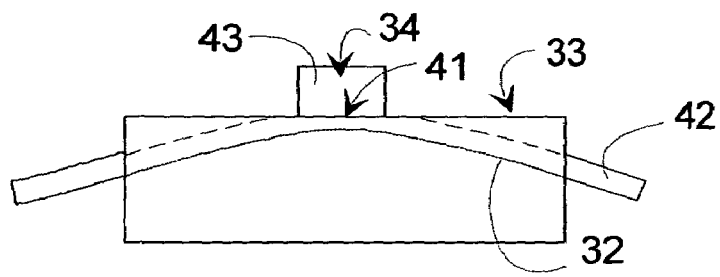
Figure 2E:
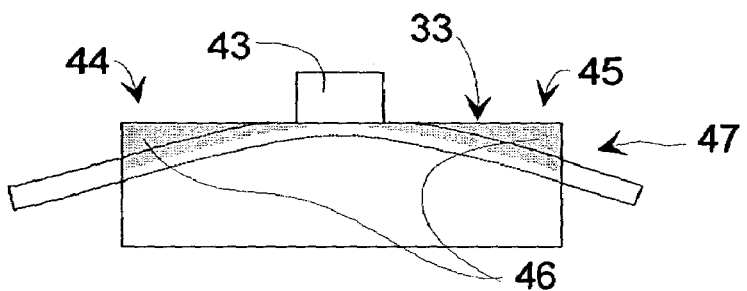
Figure 2F:
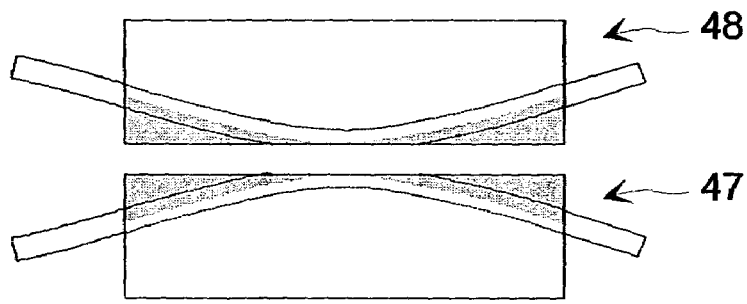
Figure 2G:
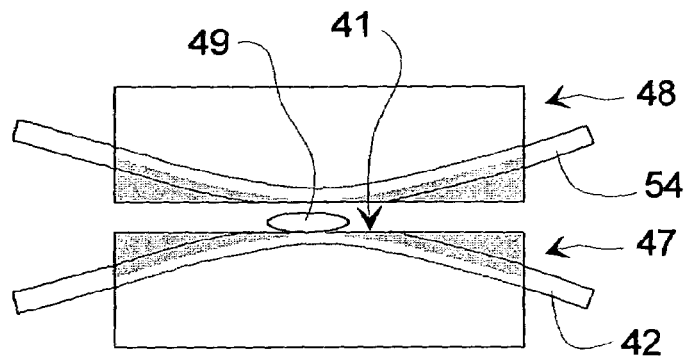
Figure 2H:
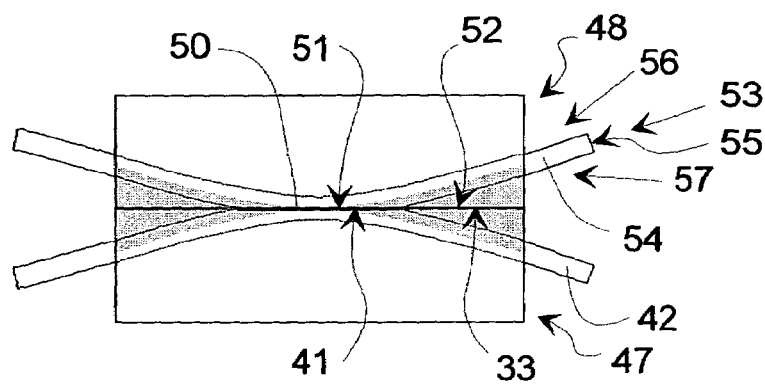
Figure 2I:
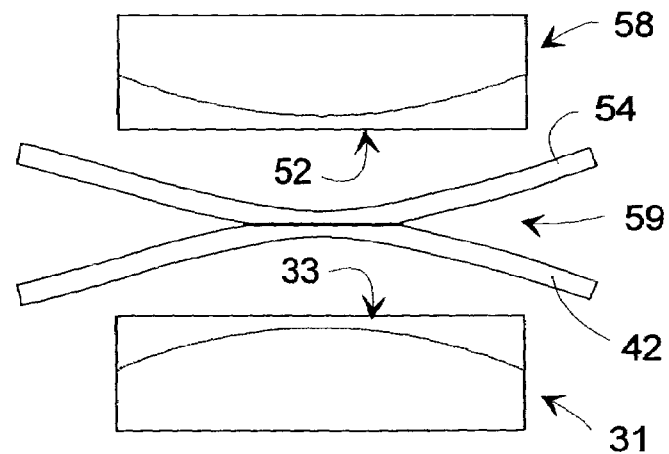

FIG. 2 consists of a sequence of nine parts, FIG. 2A through FIG. 2I. What are shown are steps along a process. Various contiguous steps depict portions of the process. Some of these process portions also comprise methods of the current invention. FIGS. 2A through 2B depicts a first portion of the process. FIGS. 2C through 2F depicts a second portion of the process. FIGS. 2G and 2H depict a third portion of the process, and FIG. 2I depicts the last portion of the process. The complete sequence FIGS. 2A through 2I also comprises a method of the invention.

The first portion of the process includes those steps illustrated in FIG. 2A through FIG. 2C. This first portion of the process is analogous to certain basic steps disclosed in the U.S. Pat. No. 15,809,188 "Tunable optical filter or reflector" and U.S. Pat. No. 25,781,675 "Method for preparing fiber-optic polarizer", both by Tseng.

In this first portion of the process, the first step, as represented in FIG. 2A, is the marshalling of a fiber 30 together with a substrate 31, wherein the substrate 30 contains an etched groove 32 having an arcuate depth profile along its length across one of its surfaces 33.

FIG. 2B then shows that the fiber 30 is placed within the groove 32 in the substrate 31, wherein the depth of the groove at its shallowest point positions the fiber 30 such that a portion of the side-wall 34 remains above the surface 33. To accomplish this placement of the fiber 30 within the groove 32, intermediate steps (not shown) may use methods and apparatuses as are disclosed in U.S. Pat. No. 6,516,131, by Tullis, titled "Structures and Methods for Aligning Fibers". In the current invention, however, dissolvable or meltable bonding materials (used as tacking materials) or other suitable bonding materials 35 and 36 are placed under and over the fiber 30 as depicted with shading in regions 37, 38, and 39. These tacking materials 35 and 36 are used to hold the fiber 30 in place for the subsequent polishing step whose results are illustrated in FIG. 2C. The materials 35 and 36 may be different from one another, or they may be the same.

In FIG. 2C, the sidewall portion 34 of the fiber 30 (shown in FIG. 2B) is polished away and is therefore not shown, leaving the same fiber now as a side-polished fiber 42. The exposed sidewall 41 of the side-polished fiber 42 is now shown instead, and the identifying number of the fiber has been changed accordingly from 30 to 42 in this and the subsequent figures. All other identifiable elements of FIG. 2C are the same as in FIG. 2B.

Thus the steps of figures FIGS. 2A through 2C accomplish the making of what we will call here a first half-coupler 40, or substrate-supported half-coupler, as shown in FIG. 2C. One aspect of the current invention, over the previously disclosed art found within the above cited U.S. patents by Tseng, is that the bonding material 35 and 36 used here need not be wicked into place from the ends of the groove 32. Also, for subsequent method steps to be described below, the material 35 and 36 can be chosen to be dissolvable, meltable, or otherwise removable, with a minimum of disturbance to the side-polished fiber 42 within the associated groove 32. If at this point (shown in FIG. 2C) the bonding material was to be removed (not shown), it would allow removal (not shown) of the side-polished fiber 42 from the substrate 31 to create what we will call here a free-standing half-coupler (not shown). A free-standing half-coupler is one that is free of any substrate 31.

In the second portion of the process, figures FIGS. 2D through 2F show the making of a bond-substituted half-coupler. In the bond-substituted half-coupler, the bonding material 36 (see FIG. 2B) is first removed. Then the bonding material 35 (see FIG. 2B) is replaced by intermediate bonding material 46 (see FIG. 2E) such that there will be little or no bonding material in the region 34 of side-polish 41 (See also FIGS. 2D, 2B, and 2C).

FIG. 2D shows that after the removal of material 36 (see FIG. 2B) from the region 34, a holding block 43 is used to press firmly against the sidewall 41 of the side-polished fiber 42 and the substrate surface 33. With the side-polished fiber 42 being held firmly within the groove 32, at least within the region 34 of the sidewall 41, the bonding material 35 (see FIG. 2B) is removed with a minimum of disturbance to the side-polished fiber 42 in the groove 32.

FIG. 2E shows the next step of bonding the end portions 44 and 45 with replacement bonding material 46. This replacement bonding material 46 should be of a type that can be easily removed later with a minimum of disturbance to the fiber 42. Before the bonding material hardens, all of the surface 33 must be wiped clean. Thus in FIG. 2E, with the exception of the holding block 43, we see depicted a finished bond-substituted half-coupler 47.

FIG. 2F shows two such bond-substituted half-couplers 47 and 48 placed face to face but not yet brought together into intimate contact with one another.

In the third portion of the process, figures FIGS. 2G and 2H show the bonding of two side-polished fibers together, with as little bonding together of the substrates as possible.

In FIG. 2G, the two bond-substituted half-couplers 47 and 48 of FIG. 2F are shown again. A small amount of permanent bonding material is placed on the side-polished surface 41 of the fiber 42 of a first bond-substituted half-coupler 47.

In FIG. 2H, the side-polished surface 51 of the fiber 54 in the second bond-substituted half-coupler 48 is aligned opposite to and facing the side-polished surface 41 of the fiber 42 in the first bond-substituted half-coupler 47. The two bond-substituted half-couplers 47 and 48 are brought together, maintaining the described alignment, to spread the permanent bonding material 49 (see FIG. 2G) out into a thin film 50 between the two said side-polished surfaces 41 and 51. The amount of permanent bonding material (49 in FIG. 2G and 50 in FIG. 2H) used for this process step should be chosen to minimize or preferably prevent it from spreading over the substrate surfaces 52 and 33 of the bond-substituted half-couplers 47 and 48. Also, a thin film of release agent (not shown) may be applied to the substrate surfaces 33 and 52 prior to applying the permanent bonding material 49 (see FIG. 2G). One technique with which to help minimize or eliminate this unwanted spreading will be described in reference to FIG. 2I below and to FIG. 3 below and provides recesses to prevent the spreading of excess permanent bonding material.

Within the step depicted by FIG. 2H, the permanent bonding material (49 in FIG. 2G and 50 in FIG. 2H) may be chosen to be a UV-curable cement, in which case it may be cured by directing UV light 53 into one or more of the fiber ends. ("Light" is defined within this specification and the claims to follow to include invisible electromagnetic radiation.) For example this light 53 may be directed axially into the fiber core (not shown) through the end-face 55 of the fiber 54. UV light may also be directed into the cladding (not shown) of the fiber 54 as depicted by beams 56 and 57. Because fibers used for low-loss transmission of near infrared light, are poor transmitters of UV light, an alternative means of delivering the UV light to cure the UV-curable material 50 is by way of an alternative path. Such a path to the bonding site between the two side-polished areas 41 and 51 can be provided (not illustrated here) with one or two pre-etched extra grooves in the surfaces 33 and/or 52 of the substrates 47 and 48, running obliquely or approximately perpendicular to the fibers 42 and 54. These extra grooves may be used as an open path for UV-light or to hold a short fiber or quartz fiber by which to deliver UV-light.

The last portion of the process is depicted by FIG. 2I. FIG. 2I shows the substrates 31 and 58 parted, leaving a freestanding, bonded 4-port coupler 59. What is not shown is that prior to parting the two substrates 31 and 58, the replacement bonding material holding the end portions of the fibers 42 and 54 into place in their respective substrates 31 and 58 is first loosened by a solvent or by heating. As a freestanding 4-port coupler 59, its two fibers 42 and 54 are now affixed together but free of the substrates 31 and 58. Note that the substrates 31 and 58 may now be reused to make yet another such apparatus. This potential reuse of the silicon substrates can significantly lower the cost of producing 4-port couplers.

It should be noted that although the above process is described with respect to the formation of a 4-port coupler, other 4-port (or 3-port) fiber-optic apparatuses can be formed with additional steps to make any of the group including couplers, add-drop multiplexers, taps, splitters, joiners, filters, modulators or switches. For example, the core of the fibers used, in the region of side-polish, can be fiber Bragg gratings, as known in the art. Or one or more films can be deposited on one or more side-polished areas, wherein such one or more films could contain Bragg gratings. Or one or more films deposited or sandwiched between the side-polished areas of two fibers could be an electro-active polymer complete with embedded electrodes for connecting to external drive circuitry.

Figure 3:
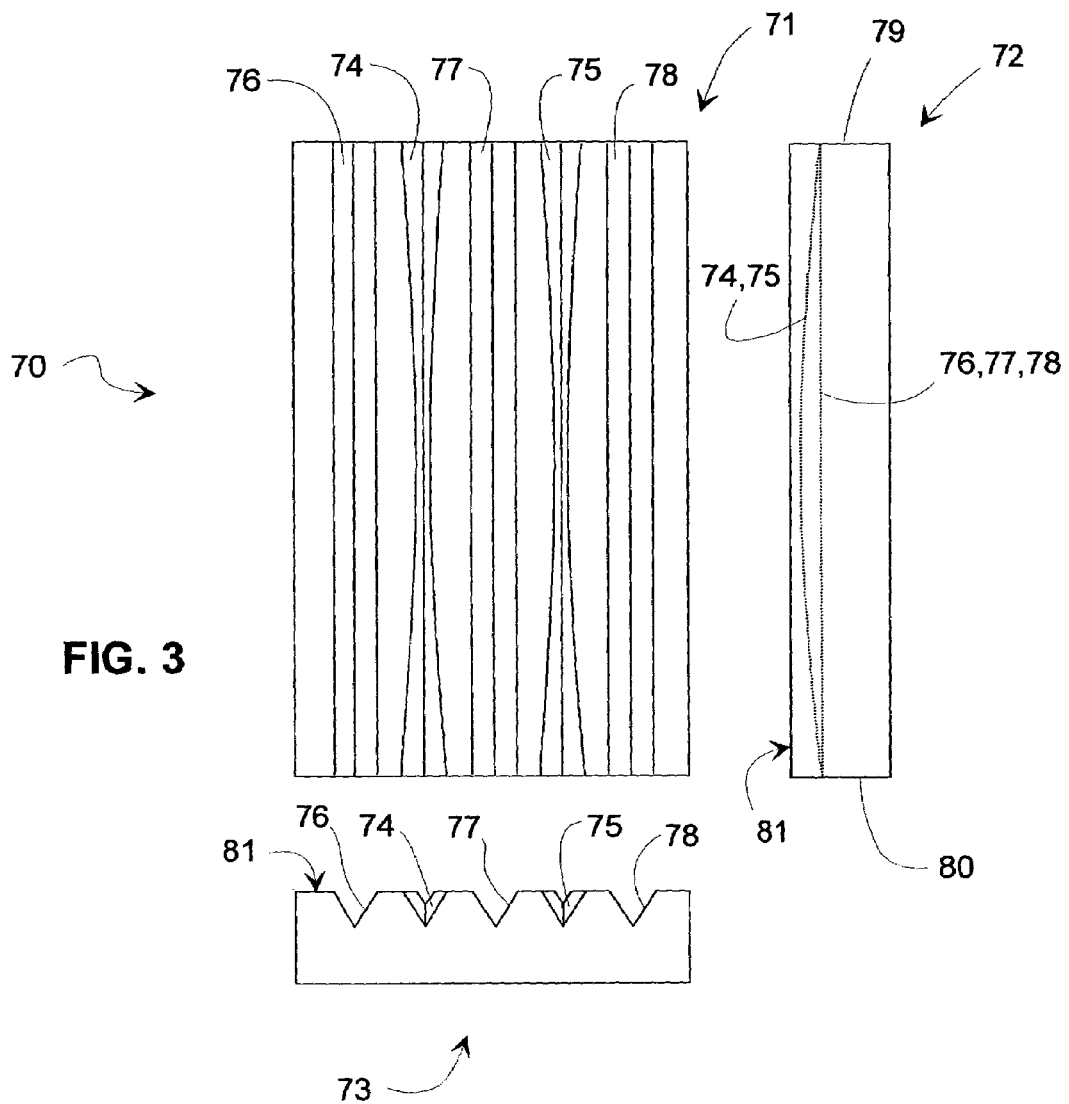
FIG. 3 shows three views of a substrate having variable width and depth V-grooves for holding fibers to be side-polished. Also shown are constant-width V-grooves, between the variable width and depth V-grooves. These constant-width V-grooves are for reducing the planar surface area of the substrate and for providing pathways for air or other gas to enter to facilitate parting of the two substrates as needed.

FIG. 3 shows one technique of this invention by which to better enable the easy parting (see FIG. 2H) of the two substrates 31 and 58 from the freestanding coupler 58 described in the previous paragraph. This technique is the use of extra grooves to minimize the surface area of the substrate areas 33 and 52 (see FIG. 3H) in contact with one another. These extra grooves provide paths for air to enter the space between the two surfaces as they are drawn apart. They also provide a means by which to insert a pointed object with which to help force the substrate surfaces apart or to force air between these surfaces. FIG. 3 shows examples of such extra grooves.

In FIG. 3, a substrate 70 is shown in a plan view 71, a side-view 72, and an end-view 73. Two arcuate grooves 74 and 75 are shown, and three straight grooves 76, 77, and 78 are shown, in an alternating sequence within surface 81. All the grooves 75 through 78 are parallel to one another. Preferably, the widths and depths of the straight grooves 76, 77, and 78 are equal to or larger than the widths of the arcuate grooves 74 and 75 where the arcuate grooves 74 and 75 reach the ends 79 and 80 of the substrate 70. The surface area left un-etched 81 between these grooves should be minimized in order to facilitate the parting of substrates (31 and 58 in FIG. 2I) placed with these faces (31 and 52 in FIG. 2I; 81 on the substrate illustrated in FIG. 3) touching one another. The substrate 70 illustrated would be able to accept two fibers, one in each arcuate groove. A linear array of more numerous arcuate grooves can be etched into a common substrate, with one or more extra grooves (illustrated as straight grooves in FIG. 3) interleaved between them, but only two arcuate grooves and three extra grooves are illustrated in FIG. 3 for drawing simplicity. As was discussed above, the purpose of the extra grooves is at least two-fold. One such purpose is to act as a barrier against spreading of permanent bonding material when fabricating a freestanding coupler. Another such purpose is to provide air access channels when parting two such surfaces that have been put face-to-face against one another.

The method portions described by FIG. 2 (FIG. 2A through FIG. 2I) were described in four sequential portions, each comprised of one or more illustrated steps. All together they describe a method for manufacturing a freestanding 4-port coupler. However, subsets of these illustrated steps, some with minor modifications, describe processes themselves that can produce alternative product results. For example, eliminating 2D through 2F, and in 2G placing sufficient material on both the side-polished areas and the substrate surfaces (without using any release agents on these surfaces, to bond both the side-polished areas and the rest of the substrates, produces a 4-port coupler with substrates intact. In this case all bonding may be of a permanent nature and of the same type. Also, in this case, the process would not include the separating of the two substrates illustrated in FIG. 2I.

FIG. 2A through FIG. 2C describes the construction of a half-coupler 40 supported by a substrate 31. Again the bonding materials used may be of a permanent nature and all of the same type.

It is easy for one skilled in the art to see that FIGS. 2A through 2C, followed by a FIG. 2D without the use of the holding block 43, can produce a freestanding half-coupler as just the fiber 42 with its side-polished area 41.

A 4-port coupler supported by only one substrate can be produce by first producing a substrate supported half-coupler, as described two paragraphs above this paragraph, and then also producing a freestanding half-coupler, as described one paragraph above this paragraph. Although more difficult, the freestanding half-coupler could then be positioned and bonded to the substrate-supported half-coupler with their side-polished areas made to substantially contact one another.

FIG. 2A through FIG. 2H, followed by the removal of only the substrate 58 would also produce a 4-port coupler supported by a single substrate. Again, in this case the bonding material used in the substrate 31 could be of the permanent type such that steps FIGS. 2D through 2F could be bypassed for that particular half-coupler component 31.

FIG. 2A through FIG. 2C, performed twice with permanent bonding material, would produce two half-couplers with supporting substrates that could be physically positioned face-to-face to produce a 4-port coupler wherein the two face-to-face substrates could be slid over one another for tuning purposes. This tuning is discussed in FIG. 1.

In the case of face-to-face substrates, one substrate may be made very small compared to the other, wherein the smaller serves as a protective cover in the final product.

Figure 4:
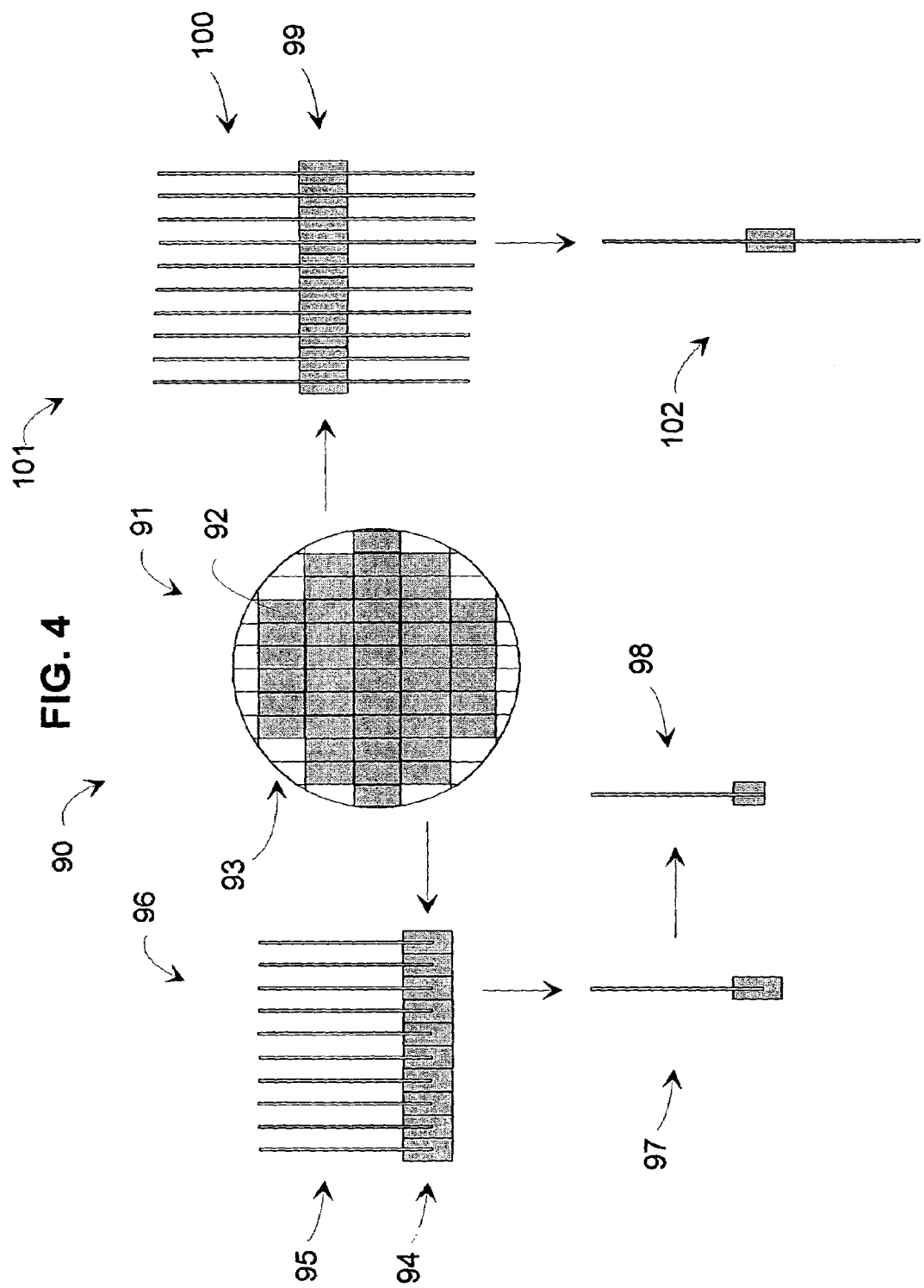
FIG. 4 depicts a method by which to produce strips of substrate-bound fibers, each fiber having substantial lead-length at either one or both ends.

FIG. 4 shows a process diagram 90 that illustrates how to efficiently mass-produce substrate-terminated fibers or side-polished 2-port half-couplers, while using the same methods as described above for each individual fiber or half-coupler with reference to FIG. 2. The substrate-terminated fibers may also be side-polished, or not. A silicon wafer 91 provides substrates (e.g. 92) arranged as rows in dicable strips (e.g. 93). Each strip can be used to construct an array of substrate-terminated fibers 96 or of half-couplers 101. An array of substrate-terminated fibers 96 is comprised of an array of fibers 95 and a substrate strip 94. The substrate-terminated fibers 96 may be side-polished or not. If the array of substrate-terminated fibers 96 is to be side-polished, they can all be side-polished at once in a single polishing step as a complete strip. An array of half-couplers 101 is comprised of an array of fibers 100 and a substrate strip 99. The array of side-polished fibers 101 can all be side-polished at once in a single polishing step as a complete strip. Once the strips (linear arrays) of substrate-terminated fibers 96 or of half-couplers 101 is completed, they may optionally be diced into individual units (97, 98, or 102) or left intact as an array. Note that substrate-terminated fibers 96 may be made such as to align the fiber end inside of the boundary of the substrate 97 or aligned with a substrate edge 98.

Figure 5:
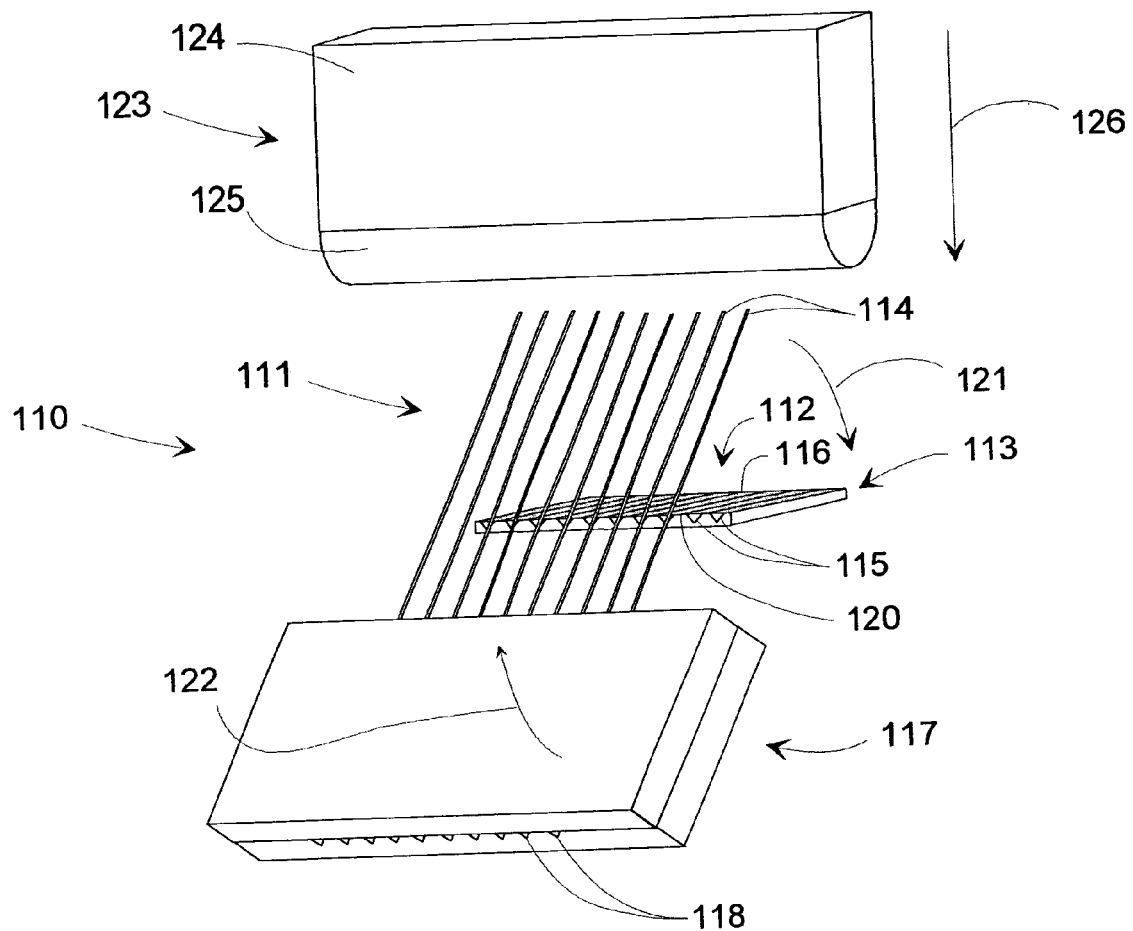
FIG. 5 shows a method and means by which to align and place an array of fibers within an array of grooves within a common substrate formed as a strip, to form a strip of half-couplers.

FIG. 5 shows a means 110, adapted from U.S. Pat. No. 6,516,131, by Tullis, titled "Structures and Methods for Aligning Fibers", by which to align and place an array of fibers 111 into an array of substrate grooves 112 within a substrate strip 113. Referring back to FIG. 4, this shows a means by which the arrays of fibers 95 or 100 may be efficiently batch processed to place them into their respective arrays of substrate grooves found within their respective substrate strips 94 and 99. In FIG. 5, two of the fibers of the fiber array 111 are labeled as pair 114. A corresponding pair of substrate grooves 115 of the array of grooves 112 is also shown.

FIG. 5 shows that the array of fibers 111 is initially held in a first common plane (not labeled) by a pair of blocks 117 with its own array of block grooves of constant pitch equal to the pitch of substrate grooves. One pair of block grooves is labeled 118.

FIG. 5 also shows that the array of substrate grooves 112 all lie in a second common plane (not shown) at the surface 116 of the substrate 113. This planar array of fibers 111 (first common plane) is first held at an angle to the planar array of substrate grooves 112 (second common plane). The array of fibers 111 is then brought into contact with an edge 120 of the substrate 113, an edge 120 running perpendicular to the length of the substrate grooves 112. The array of fibers 111 is then drawn along this edge until they drop into the ends of the grooves in the array of substrate grooves 112, one fiber to each groove. The array of fibers 111 (within the first common plane) are then rotated in the directions 121 and 122 toward the common plane of the substrate grooves 112 (within the second common plane). The substrate grooves 112 are arcuate in shape, being wider and deeper at the ends then in between and being formed by 111 Miller planes from a 100 surface of a cubic crystal such as silicon.

Still referring to FIG. 5, as each individual fiber of the array of fibers 111 is guided by the sloped sides and curvatures of the respective individual arcuate grooves in the array of substrate grooves 112, a tool 123, such as comprised of a block 124 and a somewhat compliant edge 125, can be brought downward in the direction indicated by the arrow 126 to press the array of fibers 111 home into their respective places within the array of substrate grooves 112. As an alternative, the somewhat compliant edge 125 can be brought down against the array of fibers 111 first at the edge 120 of the substrate and then slid toward the midpoint of the grooves as the plane of fibers 111 is rotated toward the plane of the grooves, all along maintaining a slight force against the surface 116 of the substrate.

Although not shown in FIG. 5, it can easily be envisioned that two or more of the fibers (e.g. 114) may be actually uncut segments of a single fiber which is continuous and looped around the substrate 113 to occupy multiple block grooves (e.g. 118) and multiple grooves (e.g. 115) of the substrate 113.

Figure 6:
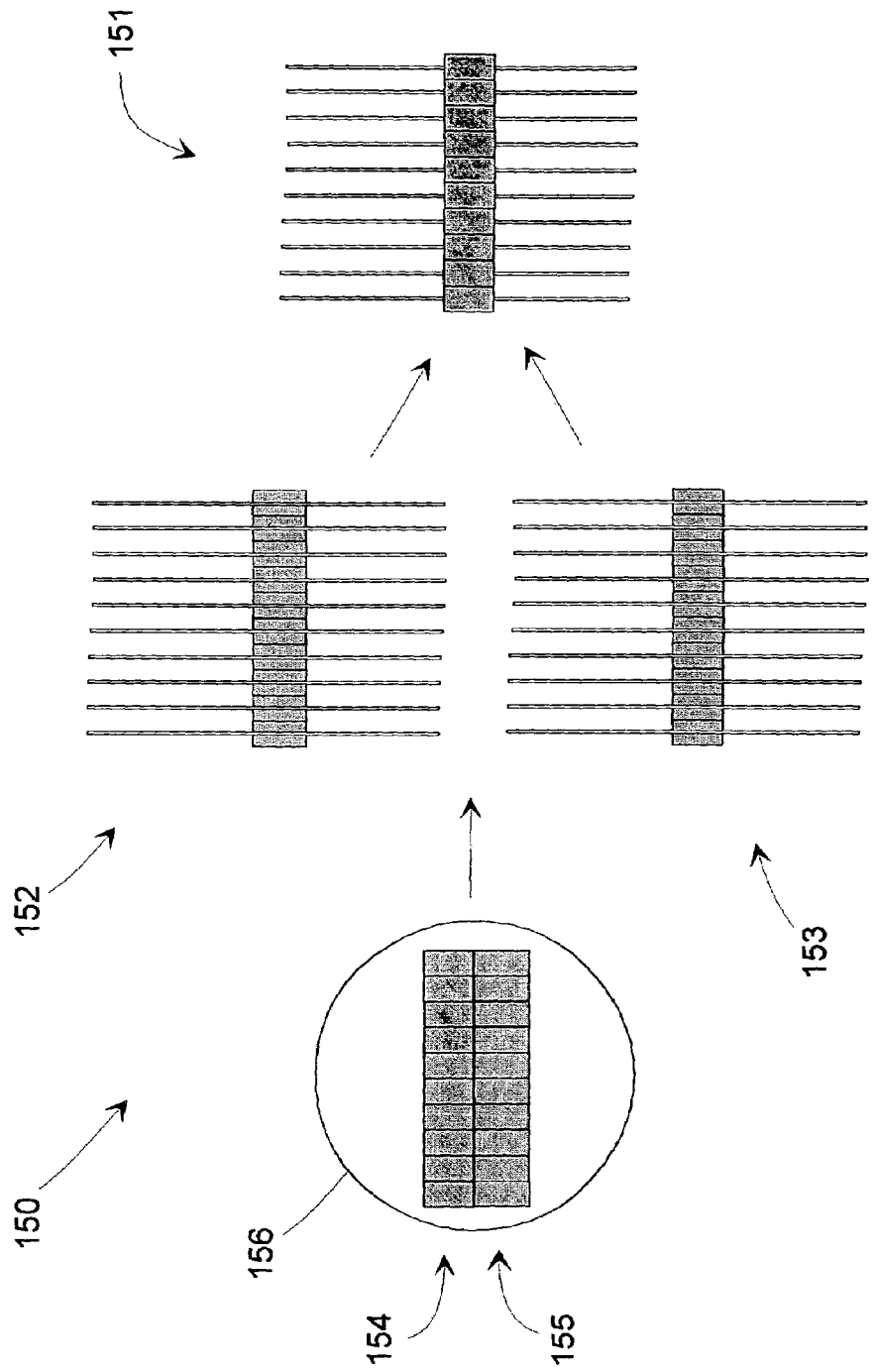
FIG. 6 shows a method and means by which to form a strip of 4-port couplers.

FIG. 6 shows the batch manufacture 150 of a strip of 4-port fiber-optic couplers 151 from two strips of 2-port half-couplers 152 and 153. The strips of 2-port half-couplers 152 and 153 can be batch manufactured by the method depicted and described above with reference to FIG. 4, including the steps illustrated and described with reference to FIG. 5. Note that the substrates for the two strips of half-couplers 152 and 153 come from two rows or strips 154 and 155 batch-fabricated from a common wafer 156 that is diced into strips. The more detailed steps are those described above with reference to FIG. 2.

Figure 7:
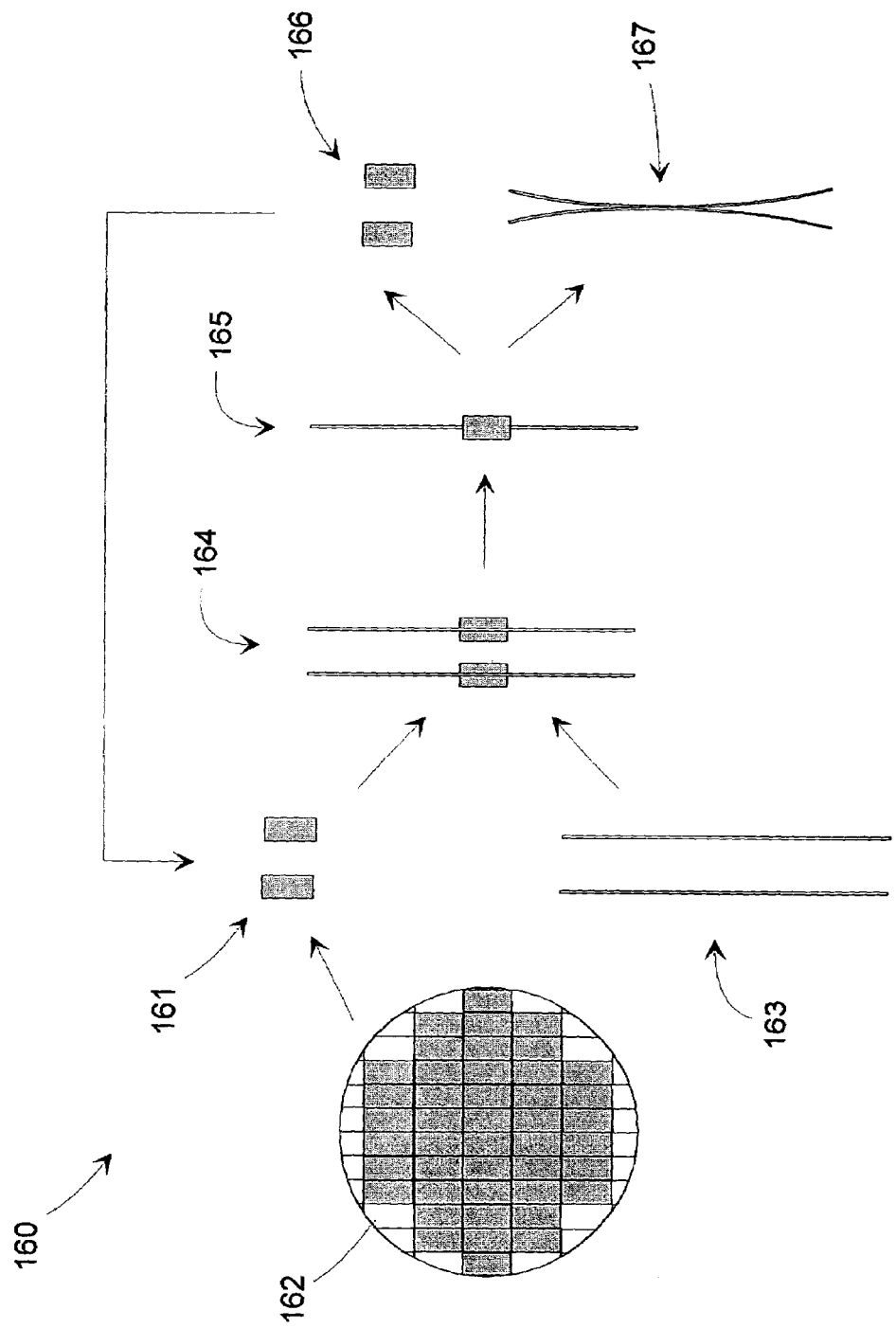
FIG. 7 shows a method and means by which, using substrates with fiber-alignment grooves, to form a free-standing 4-port coupler, and having the option to reuse the substrates.

FIG. 7 shows an alternative to batch processing in strips. Here, individual die are taken from a batch-processed wafer and used with the methods described above with reference to FIG. 2. What is shown is a wafer process 160 beginning with die 161 being taken as individual grooved substrates from a batch processed wafer 162. Next these die 161 are combined with fibers 163 to produce individual half-couplers 164. In turn, these half-couplers 164 can be combined in pairs to form individual substrate-supported 4-port couplers 164. Optionally thereafter, the substrate-supported 4-port couplers 165 can be processed to remove a freestanding 4-port coupler 167 from the substrates 166. The substrates 166 can then be reused, keeping the material cost in the 4-port couplers 167 to a minimum.

Figure 8:
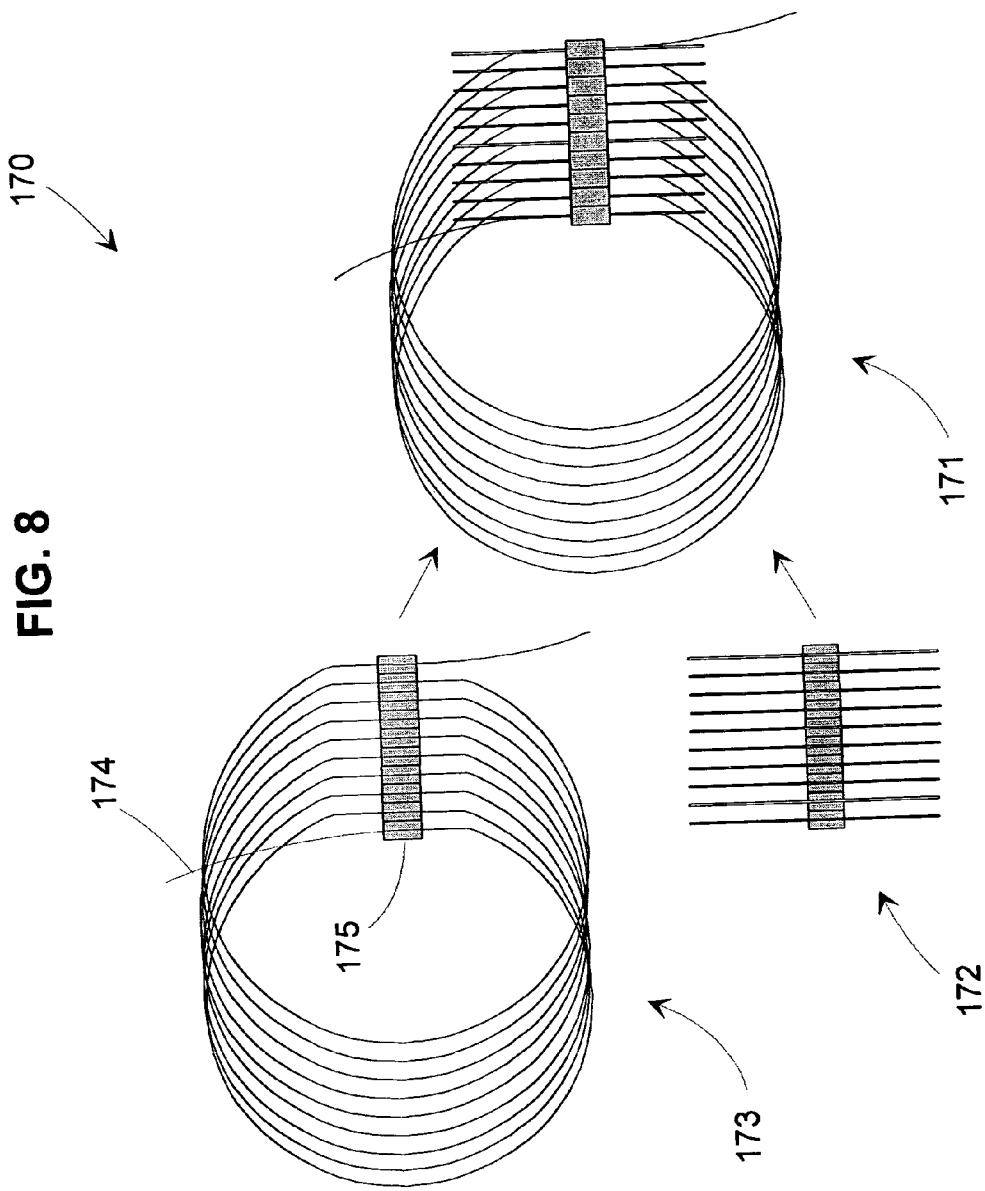
FIG. 8 shows a method and means by which to form a multi-channel optical add-drop multiplexer from both a first strip of half-couplers and a second strip of half-couplers, wherein the second strip has a common fiber wrapped in recirculating loops through the strip. Either one or both fibers at each coupling region between two side-polished areas would have a core-based or surface-based, wavelength-selective grating.

FIG. 8 shows the manufacture 170 of a multi-channel optical add-drop multiplexer 171 (OADM). Many other apparatuses, such as a one-to-many power splitter, can be created using a similar structure. This add-drop multiplexer 171 is made from a first strip of half-couplers 172 and a second strip of half-couplers 173. The fiber 174 used in this second strip is a single fiber and runs in loops to pass once through each of the individual grooves of the substrate strip 175. Preferably, the loops formed by the fiber 174, together with the plane of the substrate 175, all lie close to a common plane for compactness. The detailed steps of fabrication can be taken from those described and illustrated with reference to FIG. 2 above. What is formed can be a many-to-one combiner or multiplexer or a one-to-many splitter or demultiplexer. If a demultiplexer is intended, one skilled in the art will know to include a grating within the fiber at the region of the side-polish and/or between the two side-polished areas of the two fibers comprising the 4-port apparatus. With the addition of a film or slice of an electro-optically or thermally active material (for example a suitable polymer or crystal), sandwiched within the interface between the two side-polished areas of the fibers, switching arrays can be formed in a similar manner to the above. By stacking multiple units of the OADM strip structure described, compact assemblies can be achieved from which to implement optical functions having many channels or cross-points.

Although the invention is described with respect to preferred embodiments, modifications thereto will be apparent to those skilled in the art. Examples may include the addition of one or more fiber-core Bragg gratings near to the side-polished area(s), or within an interface between two side-polished areas, converting what would each otherwise be a coupler to an optical add-drop multiplexer OADM. Another example would be the addition of a film, thin slice, or deposited layer (such as of an electro-optically active material or thermally active material) within the interface between side-polished areas, converting what would otherwise be a passive apparatus into an active apparatus such as a modulator or optical switch, even a wavelength selective modulator or optical switch. One skilled in the art of cross-point array switches can see how the disclosed apparatuses can be coupled to create optical switch arrays. And one skilled in the art of variable attenuators can see how the disclosed apparatuses can be used as variable attenuators by having an electro-active or thermally active film or slice of material in the interface between side-polished areas. Therefore, the scope of the invention is to be determined by reference to the claims that follow.

We claim:

1. A method of manufacturing at least one 4-port, side-polished, fiber-optic apparatus comprising:
   (a) providing a first and second optical fiber;
   (b) providing a first substrate having a first surface and a first groove within said first surface;
   (c) providing a second substrate having a second surface and a second groove within said second surface;
   (d) providing a first, second and third bonding material;
   (e) using said first bonding material to hold said first optical fiber within said first groove on said first surface of said first substrate;
   (f) removing the side-wall of said first optical fiber by polishing to create a first side-polished area of said first optical fiber;
   (g) using said second bonding material to hold said second optical fiber within said second groove on said second surface of said second substrate;
   (h) removing the side-wall of said second optical fiber by polishing to create a second side-polished area of said second optical fiber;
   (i) bonding together said first and second side-polished areas using said third bonding material; and
   (j) removing said second bonding material;
   whereby the first and second optical fibers remain bonded together at their side-polished areas, supported by said first substrate and free of said second substrate.

2. The method of claim 1, further including subsequent reuse of said second substrate.

3. The method of claim 1 further including its repetition at another location along at least one of the fibers.

4. The method of claim 1 further including removing said first bonding material, whereby the first and second optical fibers remain bonded together at said side-polished areas and free of both of the substrates.

5. The method of claim 1, wherein said first and second bonding materials are the same type and are removed substantially simultaneously.

6. The method of claim 1, wherein said second bonding material can be softened by heating.

7. The method of claim 1, wherein said second bonding material can be removed using a solvent.

8. The method of claim 1, wherein said third bonding material is UV-curing material.

9. The method of claim 8, wherein UV radiation is delivered to expose said third bonding material by way of an optical fiber.

10. A method of manufacturing at least one 4-port, side polished, fiber-optic apparatus comprising:
   (a) providing a first and second optical fiber;
   (b) providing a first substrate having a first surface and a first groove within said first surface;
   (c) providing a second substrate having a second surface and a second groove within said second surface;
   (d) providing a first, second, third, fourth, and fifth bonding material;
   (e) using said first bonding material to hold said first optical fiber within said first groove;
   (f) using said second bonding material to hold said second optical fiber within said second groove;
   (g) removing the side-wall of said first optical fiber by polishing to create a first side polished area;
   (h) removing the side-wall of said second optical fiber by polishing to create a second side-polished area;
   (i) removing said first and second bonding materials;
   (j) using said third bonding material to hold said first optical fiber within said first groove, wherein said third bonding material is kept away from said first side-polished area;
   (k) using said fourth bonding material to hold said second optical fiber within said second groove, wherein said fourth bonding material is kept away from said second side-polished area;
   (l) bonding together said first and second side-polished areas using said fifth bonding material; and
   (m) removing said fourth bonding material;

whereby the first and second optical fibers remain bonded together at their side-polished areas and supported by only the first substrate, and wherein said second substrate is freed.

11. The method of claim 10 further including removing said third bonding material, whereby said first and second optical fibers remain bonded together at their side-polished areas and are free of both substrates.

12. The method of claim 1 further comprising adding at least one additional groove in at least one of the group consisting of said first surface and said second surface.

13. A method of simultaneously fabricating an array of 4-port side-polished fiber-optic apparatuses comprising:
 (a) providing a first and second bonding material;
 (b) providing a first array of side-polished optical fibers, wherein each of the fibers has a first side-polished area lying in the plane of a first surface of a supporting first substrate, and wherein said first array of side-polished optical fibers is bonded to said supporting first substrate by means of said first bonding material;
 (c) providing a second array of side-polished optical fibers, wherein each of the fibers has a second side-polished area lying in the plane of a second surface of a supporting second substrate;
 (d) aligning said first and second arrays such that said first and second side-polished areas pair up respectively in contact with one another;
 (e) bonding together said first and second side-polished areas using said second bonding material; and
 (f) removing said supporting first substrate by first removing at least a portion of said first bonding material.

14. The method of claim 13 wherein said aligning is at least partially accomplished using at least one additional fiber as a locating key sandwiched between two grooves.

15. The method of claim 13 further comprising adding at least one additional groove in at least one of the group consisting of said first surface and said second surface.

16. The method of claim 1 further comprising:
 (a) providing at least one additional fiber;
 (b) providing said first surface with a first alignment groove;
 (c) providing said second surface with a second alignment groove;
wherein the bonding together of said first and second side-polished areas is preceded by aligning said first and second side-polished areas using said at least one additional fiber as a locating key sandwiched between said first alignment groove and second alignment groove.

* * * * *